Nov. 19, 1963 D. F. MURPHY 3,111,632

TRANSISTOR OSCILLATOR

Filed June 17, 1960

INVENTOR.
DESMOND F. MURPHY

BY Milton E. Gilbert

ATTORNEY

1

3,111,632
TRANSISTOR OSCILLATOR
Desmond F. Murphy, Wayne, N.J., assignor to Globe Industries, Inc., Dayton, Ohio, a corporation of Ohio
Filed June 17, 1960, Ser. No. 36,996
3 Claims. (Cl. 331—113)

The present invention relates to transistor oscillator and is more particularly concerned with a transistor push-pull oscillator employed as an inverter.

Many circuit arrangements have been developed for utilizing transistors in push-pull arrangement to provide an oscillator inverter. Oscillations are generally initiated by a starting current in the input circuit; and in the feed-back type oscillator, the oscillations are sustained by energy supplied from the output circuit. It has been common practice to supply the starting current from a voltage source separate from the output voltage source. It has previously been proposed to use such a transistor oscillator wherein a pair of transistors are inductively intercoupled by a saturable core transformer to form a multivibrator for converting D.C. power into A.C. power. In one such multi-vibrator, certain windings of a transformer apply control signals to the transistors, and the transistors function as a switching system to control the voltages applied to other windings of the transformer. By reason of this interconnected control between the transistors and the transformer, the system will oscillate freely and form an A.C. output. This A.C. output may be essentially rectangular shaped waves, which, if desired can be rectified to form a relatively smooth D.C. voltage with little or no filtering. Converter systems of this type may therefore, be seen to be useful for changing D.C. of one voltage to D.C. of another volatge, as well as for converting D.C. into A.C.

In such systems, variations in load and input voltage cause variations in the magnitude and frequency of the output voltage. There is therefore, need for an inverter of this general class wherein the voltage magnitude and the frequency of the output may be regulated or controlled.

In accordance with the present invention, an improved electrical inverter circuit is provided including saturable reactors for producing an alternating output quantity having a characteristic which is relatively independent of variations in input power supply. It is another object of the invention to provide a transistor oscillator inverter wherein regulating transistors are biased by the output of a saturable reactor. It is a further object of the invention to provide such a transistor oscillator inverter having a saturable core transformer controlled base drive circuit wherein the voltage input to the primary of such transformer is relatively stabilized. Still another object of the invention is to provide a transistor oscillator having an output supplying pulses of power in such manner that the power output per unit of time is maintained substantially constant. A still further object of the invention is to provide a novel quasi-square wave oscillator.

Figure 1:
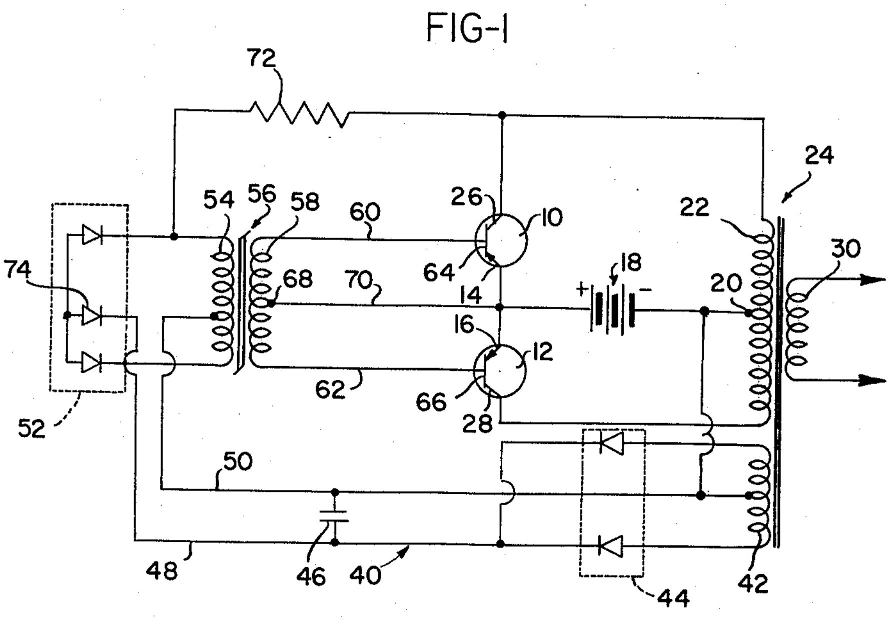
Figure 2:
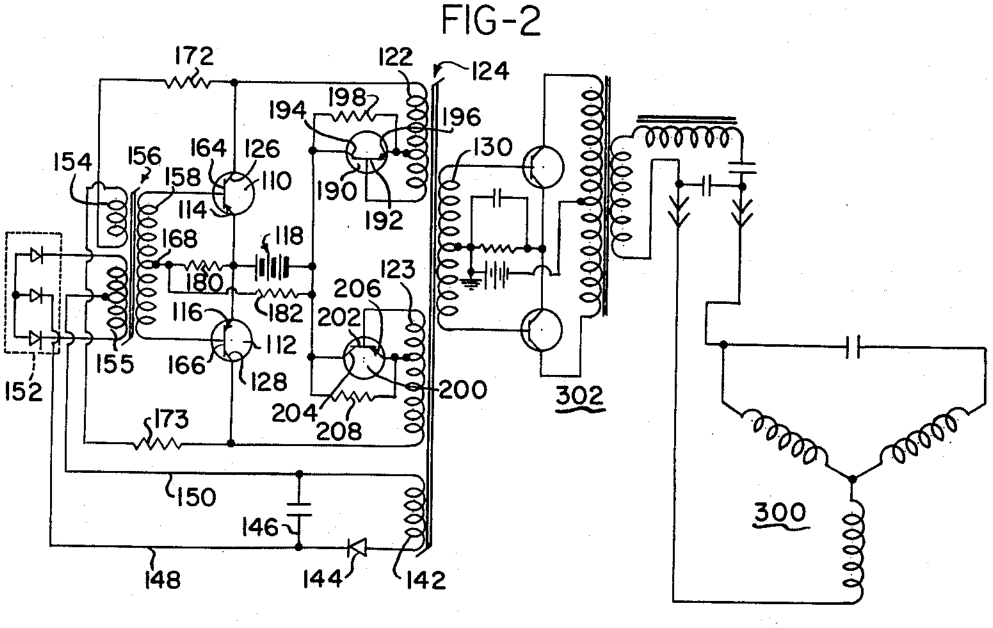

These and further objects of the invention will become more readily apparent upon a reading of the description following hereinafter, and upon a consideration of the drawings, in which:

FIGURE 1 is a circuit diagram of a common-emitter transistor oscillator according to the present invention; and FIGURE 2 is a circuit diagram of another embodiment of the transistor oscillator in accordance with the present invention.

Transistor oscillators may operate in accordance with two principles; either as a voltage feed-back oscillator, or as a current feed-back oscillator employing a negative resistance characteristic of the transistor, which is available under certain operating conditions. The latter application is possible only when utilizing transistors having current amplification greater than unity, and makes possible a number of oscillator circuits which are non-analogous to vacuum tube oscillator circuits. Transistor oscillators of the saturable reactor type have relatively poor frequency stability with respect to variations in input voltage. This voltage frequency relationship is inherent in any device using the saturation period of a reactor as the frequency determining element.

2

In the instant invention, there is provided a transistor oscillator which is stable with respect to supply voltage variation. The means employed to accomplish this function is a voltage stabilization network in the coupling circuit for the base electrodes of the transistors. Although a push-pull two transistor oscillator is shown, it is to be readily understood that a four transistor bridge type circuit may also be used as the switching elements.

In accordance with FIGURE 1, the oscillator comprises a pair of P-N-P transistors 10 and 12 connected in push-pull relation with their respective emitters 14 and 16 connected directly to the positive terminal of a D.C. voltage source, such as a 28-volt battery 18. The negative terminal of this battery 18 is connected directly to the center tap 20 of a primary winding 22 of a transformer 24. The transformer 24 may be provided with a core of iron, ferrite or other suitable magnetic material. Opposite ends of the transformer primary winding 22 are connected to the respective collector electrodes 26 and 28 of the transistors 10 and 12.

Secondary winding 30 is connected to the load, and although a step-down relationship is shown, it is readily understood that a step-up transformer may be provided, depending upon the requirements for operating the load.

A voltage feed-back network 40 is provided which includes a winding 42 inductively coupled to the primary side of the transformer 24. The pulsating voltage induced into coil 42 is rectified in a full wave rectifier 44. The output of this rectifier 44 is employed to charge the capacitor 46. Preferably the time constant of the capacitor, is such that high frequency components are removed and that a D.C. voltage is obtained which is proportional to the D.C. input voltage. The voltage feed-back of the network 40 is connected by conductors 48 and 50 through a diode network 52, to the primary 54 of a second transformer 56. A secondary winding 58 of the transformer 56 has its terminals connected by conductors 60 and 62 to the base electrodes 64 and 66 of the transistors 10 and 12, respectively. A center tap 68 on the winding 58 is connected by conductor 70 to the positive terminal of the D.C. source 18. Positive feed-back is provided from the collector transformer 24 to the base transformer 56 by the resistor 72.

With a load connected into the circuit above described, due to unavoidable asymmetry, one or the other transistors 10 or 12 will spontaneously start to conduct current. It is understood that an external starting network of resistors, capacitors, or diodes may be used to aid starting. Assuming, for purposes of illustration, that the transistor 10 begins to conduct first, the change of current at collector 26 produces a voltage across the upper half of the transformer primary winding 22 which drives the potential at this collector electrode more positive than the potential at the negative terminal of battery 18. This conduction is reinforced by the positive feed-back and will increase at a rate consistent with the natural frequency of the oscillator. The increase in current may be considered as a step function up to a saturation level of the transistor 10. Saturation conduction will be maintained as long as it is consistent with the low frequency passband of the oscillator and as long as loop gain remains above unity. A current path with transistor 10 conducting and transistor 12 cut-off, may be traced from the positive terminal of the D.C. source 18 through emitter 14, and via collector 26 and through winding 22 to the negative terminal of the D.C. source 18. At the same time, drive current is flowing from the transformer 56 through conductor 70, to emitter 14, base 64 and through conductor 60 to transformer 56. Operation will continue with transistor 10 conducting and transistor 12 cut-off, until a period of time has elapsed such that the core of the transformer 56 has become saturated due to the feed-back voltage impressed upon it. The transformer 56 is wound on a square hysteresis loop core. Upon saturation, the impedance of the transformer is effectively reduced and it is unable to support voltage or provide current to drive the base 64 of transistor 10. When this occurs, the current through transistor 10 is reduced and therefore the current through transformer 24 is reduced. At saturation the collapse of flux in transformers 24 and 56 will generate a negative spike in the base transformer 56. This negative spike causes a voltage of opposite polarity to be produced in its windings. This negative spike causes transistor 10 to be cut-off and transistor 12 to become conductive, since current will now flow in the base biasing circuit of transistor 12. This state now continues until the core of transformer 56 saturates in the reverse direction completing a second half cycle, whereupon the initial state again prevails, and the cycle repeats.

In circuits as above described, the main disadvantage is the time voltage relationship of transformer saturation. Since a transformer will saturate after receiving a predetermined number of volt seconds, as the applied voltage is increased, the time for saturation is decreased. In order to control the oscillator frequency, it is therefore necessary to control the voltage applied to the base transformer 56. Where regulation for frequency control is desired, regulation of the voltage to the saturating base transformer, enables the use of only a small portion of the total power. In such event, the transformer 24 need not be a saturable transformer, thus effecting a savings in cost of components.

Regulation of the base feed-back voltage is obtained by the network 40 and the voltage regulating element 52. For any given polarity of conduction a Zener diode, one of the two non-Zener diodes in element 52, the feedback voltage (network 40) and resistor 72 are effectively in series and comprise the total feedback signal network. The voltage appearing across transformer 56 at any given time is effectively the Zener voltage 74, compensating voltage 40, and the forward voltage across one of the non Zener diodes 52. Each of the non Zener diodes 52 conduct for one half a cycle and are back phased for half a cycle. These diodes allow the Zener and compensating voltage to appear across each half of the transformer alternately. As is well known, the phenomena involved in a diode operating in its "Zener discharge region" is that for a sufficiently great inverse voltage applied to the semi-conductor diode, the diode becomes highly conductive, and maintains a substantially constant voltage across its terminals during variations of current through the diode. Nevertheless, a slight variation in the voltage will occur, and in the circuit employed in one embodiment of the invention, wherein the power supply varied from 20 to 30 volts, a 10% variation in voltage over the range of currents produced, occurred. This resulted as a like 10% variation in frequency. In order to compensate for this variation and produce a stable reference voltage, a small voltage generated in the coil 42 from the collector transformer 24 is rectified in the full wave rectifier 44 and fed back to the base control circuit in series bucking with the Zener voltage. Since the collector output is directly proportional to input voltage, by tapping the output of the collector down to the proper amount, any desired variation in the feed-back voltage can be produced. If the variation on this feed-back voltage is made equal to the variation in the Zener voltage and further if they are connected in series bucking, a constant voltage will be produced across the network. It is this constant voltage which is used in conjunction with saturable transformer 56 to produce stable frequency. The Zener voltage and feed-back compensation network therefore provide an oscillator of much greater frequency stability with voltage variations.

In many applications, output power regulation is desired, i.e. either the voltage must not be permitted to go too high, or there is a maximum current limitation. In the above described embodiment of the invention, as the input voltage increases, the output voltage will increase. There are several standard methods for regulating power supplies. In a first such method, a plurality of parallel transistors are placed in series adjacent the input. By controlling the overall voltage across the transistors an effective constant input voltage of the system is maintained. Such a system is known as a loss regulator. This system basically burns up power and thus wastes it. In another type of system, various forms of magnetic amplifiers are employed for regulating, either on a voltage level basis or on a duty cycle basis. In the embodiment of the invention illustrated by FIGURE 2, overall power is regulated by duty cycle modulation. Thus, the output pulse train from the output transformer will be regulated by means described, above, to maintain a constant frequency; in addition, there is introduced a dwell or off-time between pulses of power so that under variations of input voltage to the system, the power output will be maintained relatively constant, i.e. the area under each pulse curve will be the same for each cycle regardless of the pulse shape.

Specifically, the method of power regulation is by double transformer saturation. In the embodiment of FIGURE 2, output voltage regulation is desired in order to eliminate over-voltage and saturation of the motor due to high input voltage. The employment of the filter circuit reduces harmonics, decreases motor heating and improves motor efficiency.

Referring now to FIGURE 2, there is disclosed a transistor oscillator basically similar to that shown in FIGURE 1. The transistor switching means comprises a pair of transistors 110 and 112, whose emitters 114 and 116, respectively are in common. The collectors 126 and 128 of the transistors 110 and 112 are connected to a split primary 122 and 123 of a collector output transformer 124. The secondary 130 of this output transformer 124 is connected to a load circuit which may be an isolating amplifier and filter circuit 302 for the excitation coils of an A.C. motor 300. The amplifier filter circuit serves the purpose of isolating the oscillator from the load to thereby improve frequency stability; and it also allows the employment of an inverter operating at very low power levels to maintain the efficiency of the system.

Positive feed-back is provided from the collector transformer 124 to a base transformer 156 by the resistors 172 and 173. The resistors 180 and 182 comprise the starting network. It is their function to provide forward bias to the transistors in the absence of oscillation. This forward bias and consequent flow of transistor current aided by any asymmetry in the circuit will cause the start of oscillation.

The core of the collector transformer 124 is also of a type having a square hysteresis loop. The two transformers 124 and 156 are so selected that the collector transformer 124 is caused to saturate at a time prior to the transformer 156 upon variations in input voltage. When the transformer 124 saturates, a short is effectively thrown across the load. In order to prevent burning-up of the transistors 126 and 128, there are provided a pair of dummy load circuits including the transistors 190 and 200. These transistors are in parallel with load resistors 198 and 208. During the interval between the saturation of the transformer 124 and the transformer 156, the resistors 198 and 208 will draw current. Prior to the saturation of transformer 124, the current flow into the primary 122 will not be impeded, since current will readily flow through the emitter 196, collector 194 path. This path is maintained at low impedance by a forward bias to saturation level applied to base 192 from transformer 124. Upon saturation of 124 this bias will collapse and the transistor 190 will become a high impedance path thereby shunting the flow of current through limiting resistor 198. As can readily be understood from an examination of the circuit, the operation of the oscillator of FIGURE 2 is similar to that of FIGURE 1 with the difference that due to the transformer 124 saturating prior to transformer 156, the inverter output is essentially shorted and voltage is removed from the load. This short will remain in effect until the base transformer 156 causes the inverter to flip to the opposite polarity, at which time the core of the collector transformer will be reset and will then charge to saturation in the opposite direction.

Considering a specific example of the application of the circuit of FIGURE 2 to a power supply for an A.C. motor, and considering that the transistors 110, 112, 190 and 200 constitute a zero impedance during conduction, it is readily seen that full voltage from the D.C. supply 118 will appear across the collector transformer 124. Variations in the D.C. voltage supply 118 will then cause similar variations in the time required for saturation of transformer 124. Assuming the supply 118 to provide 20 volts, then the transformer 124 will be made to saturate at 1.25 milliseconds. At this voltage level, both transformers will flip at the same time and the inverter will put out a square wave signal. This can be considered as the point of operation at rated voltage input and desired output.

As the supply voltage is increased to 30 volts, the saturation time of the collector transformer 124 was made to decrease to .83 millisecond and the output wave form then appeared as a quasi-square wave of .83 millisecond power pulse and .42 millisecond dwell, or effectively ⅔ duty cycle. The duty cycle is thus made a direct function of input voltage. As indicated above, the transistors 190 and 200 provide for a dummy load for the inverter during the period in which the output transformer 124 is in saturation, to maintain saturation current in the transformer 124. During the period before saturation, the transistors are kept in conduction by the forward bias tapped off of the split primary 122 and 123. As the transformer 124 saturates, this bias disappears and transistors 190 and 200 are shut off.

The degree of A.C. regulation obtained by the employment of the method of regulation by double transformer saturation is a function of the absolute values of dwell time used.

I have thus provided a system of regulation requiring no sensing loops and feed-back amplifiers. Although specific embodiments of the invention have been shown and described, it will be readily apparent to one skilled in the art, that various modifications may be made without departing from the scope of the invention as set forth in the claims appended hereto.

What I claim is:

1. A transistor oscillator providing regulated power output comprising, in combination: a power stage including a pair of transistors connected in push-pull relationship to generate alternating power output pulses; a timing saturable core transformer having its secondary connected to drive the base electrodes of said transistors; a source of D.C. power; a saturable core power output transformer having its primary connected to receive power from said D.C. power source in accordance with the power pulses from said transistors; the saturation time constant of the output transformer being directly proportional to variations in input voltage from said D.C. power source, whereby upon input voltage variations said output transformer will saturate at a time prior to saturation of said timing transformer; the primary of said output transformer being further connected in positive feedback with the primary of said timing transformer; the secondary of said output transformer being adapted to be connected to a load circuit to provide regulated power thereto; and a dummy load network in the power output line from said transistors and connected to the primary of said output transformer.

2. The transistor oscillator of claim 1 wherein said dummy load network includes switching means in series with the output of said power stage and the primary of said output transformer, said switching means serving to cause power to flow to said dummy load when said output transformer saturates prior to the saturation of said timing transformer.

3. The transistor oscillator of claim 1 wherein said switching means comprises transistors whose bases are biased by the primary of said output transformer and load resistors in parallel with the collector-emitter of said latter transistors.

References Cited in the file of this patent

UNITED STATES PATENTS 2,968,738 Pintell ---------------- Jan. 17, 1961